United States Patent [19]

Clements

[11] Patent Number: 5,010,868
[45] Date of Patent: Apr. 30, 1991

[54] GAS-PHASE PROPANE FUEL DELIVERY SYSTEM

[76] Inventor: Jerry Clements, 24555 Pases De Toronto, Yorba Linda, Calif. 92686

[21] Appl. No.: 504,558

[22] Filed: Apr. 3, 1990

[51] Int. Cl.$^5$ ............................................. F02B 43/00
[52] U.S. Cl. ..................................... 123/527; 123/577
[58] Field of Search .................. 123/527, 525, 577

[56] References Cited

U.S. PATENT DOCUMENTS

| | | | |
|---|---|---|---|
| 4,489,700 | 12/1984 | Van Der Weide | 123/527 |
| 4,513,728 | 4/1985 | Uilman | 123/527 |
| 4,553,519 | 11/1985 | Masson | 123/527 |
| 4,617,904 | 11/1985 | Pagdin | 123/527 |
| 4,715,325 | 12/1987 | Walker | 123/1 A |
| 4,878,475 | 11/1989 | Birsa | 123/525 |

OTHER PUBLICATIONS

Illustrations of Common Practice on: (1) Air & Gas Properties; (2) Carburetion Schematic Diagrams, (3) Trouble Shooting.

Primary Examiner—E. Rollins Cross
Attorney, Agent, or Firm—Stetina and Brunda

[57] ABSTRACT

A gas phase fuel delivery system is provided for delivering a vapor phase fuel to a regulator independent of fuel tank temperatures, the system comprises a storage tank for storing a fuel, such as liquid phase propane, and a regulator in fluid communication with the tank for receiving the fuel from the tank and for outputting a vapor phase fuel. A pressure sensor is provided for monitoring pressure conditions within the tank and for enabling a pump for supplementing fluid pressure when the tank pressure falls below a preset threshold.

7 Claims, 1 Drawing Sheet

POWERBANK PROPANE FUEL DELIVERY SYSTEM

POWERBANK PROPANE FUEL DELIVERY SYSTEM

GAS-PHASE PROPANE FUEL DELIVERY SYSTEM

FIELD OF THE INVENTION

The present invention relates to a gas-phase propane fuel delivery system and, more particularly, to apparatus for generating a minimum input pressure to a regulator used in such systems.

BACKGROUND OF THE INVENTION

In a typical gas-phase propane fuel delivery system, gas under high pressure (up to 220 psi) is fed to a regulator which reduces the pressure to a level compatible with the carburetor of an internal combustion engine. Since the tank pressure is constant, the engine need not be running in order to have gas flow. A solenoid valve may be connected to the output of the regulator to interrupt a gas flow from the regulator in the event of engine shut off. Upon cranking at start up of the internal combustion engine a vacuum switch may be activated by the resulting engine manifold vacuum. The vacuum switch in turn activates the solenoid valve, enabling gas flow from the regulator. The gas flow remains enabled as long as there is sufficient engine vacuum to keep the solenoid valve open, i.e. so long as the engine remains running.

In cold climates, engine starting problems frequently develop. The regulator requires a certain minimum input pressure in order to function properly. However, as the gas tank temperature drops, the vapor pressure internally drops. That reduction in vapor pressure proceeds according to the laws of physics, which state that a confined gas under pressure has a specific vapor pressure at a specific temperature, or, conversely, that a specific gas temperature occurs at a specific gas vapor pressure. If the temperature of the tank gets low enough, the pressure to the regulator may get so low that the propane never transfers to a vapor phase. If this happens, the regulator "freezes", i.e. the regulator pumps liquid into the carburetor. That causes a flooded condition in the carburetor and the engine will not run.

Existing systems address the cold weather limitations of propane fuel systems from various perspectives. However, none of those systems appear to provide a reliable solution that is independent of operator intervention after initial setup. For example, in diesel engines, it has been known to remedy cold weather problems by providing a direct injection of ether into the carburetor to get the engine started, and then to provide further sporadic injections of ether into the carburetor until enough heat has been generated to vaporize the diesel fuel.

Another technique for avoiding regulator freezing is to heat the propane tank, either by gas burners or by some other means, until the desired temperature and pressure conditions are obtained within the tank. Typically, if the unit being run is a generator set, a small enclosure may be formed about the generator set, housing a system for heating the generator set to provide sufficient pressure in the propane tank to cause the regulator output to be in a vapor phase. The space, cost and safety penalties attendant to building such an enclosure, and providing a system for heating the generator set may be entirely unacceptable, particularly when the system is designed for use in remote locations where simple, safe and reliable operation is a high priority.

In practice, the cold weather limitations of contemporary propane fuel systems have frequently required that propane powered equipment be maintained in heated areas and started prior to leaving the heated area. Though this practice avoids persistent problems in starting a propane fuel system that has been left in the ambient air, such practices are directed more towards avoiding problems and limitations of contemporary systems rather than solving those problems.

The present invention is intended to solve these and other problems of conventional propane fuel delivery systems by providing a reliable and economical system that need not be maintained in a heated area, does not require any manual intervention, and does not require heating of the propane tank to effect delivery of vapor-phase propane to the carburetor regulator.

SUMMARY OF THE INVENTION

A gas phase fuel delivery system is provided for delivering a vapor phase fuel to a regulator independent of fuel tank temperature, the system comprises a storage tank for storing a fuel, such as liquid phase propane, and a regulator in fluid communication with the tank for receiving the fuel from the tank and for outputting a vapor phase fuel. A pressure sensor is provided for monitoring pressure conditions within the tank and for enabling a pump for supplementing fluid pressure when the tank pressure falls below a preset threshold. The fuel delivery system provides alternate flow paths. The first flow path is utilized when the pressure in the tank is above the predetermined threshold. The alternate flow path, through a pump, such as a cryogenic pump, is used only when the pressure in the tank falls below the predetermined level. The pump is preferably constructed to operate at temperatures below $-30°$ C.

In the presently preferred embodiment the fuel delivery system is utilized in conjunction with a propane fuel system. However, it is to be understood that, in its broader aspects, the invention has application in connection with other types of fuel systems.

DETAILED DESCRIPTION OF THE PREFERRED EMBODIMENT

Figure 1:
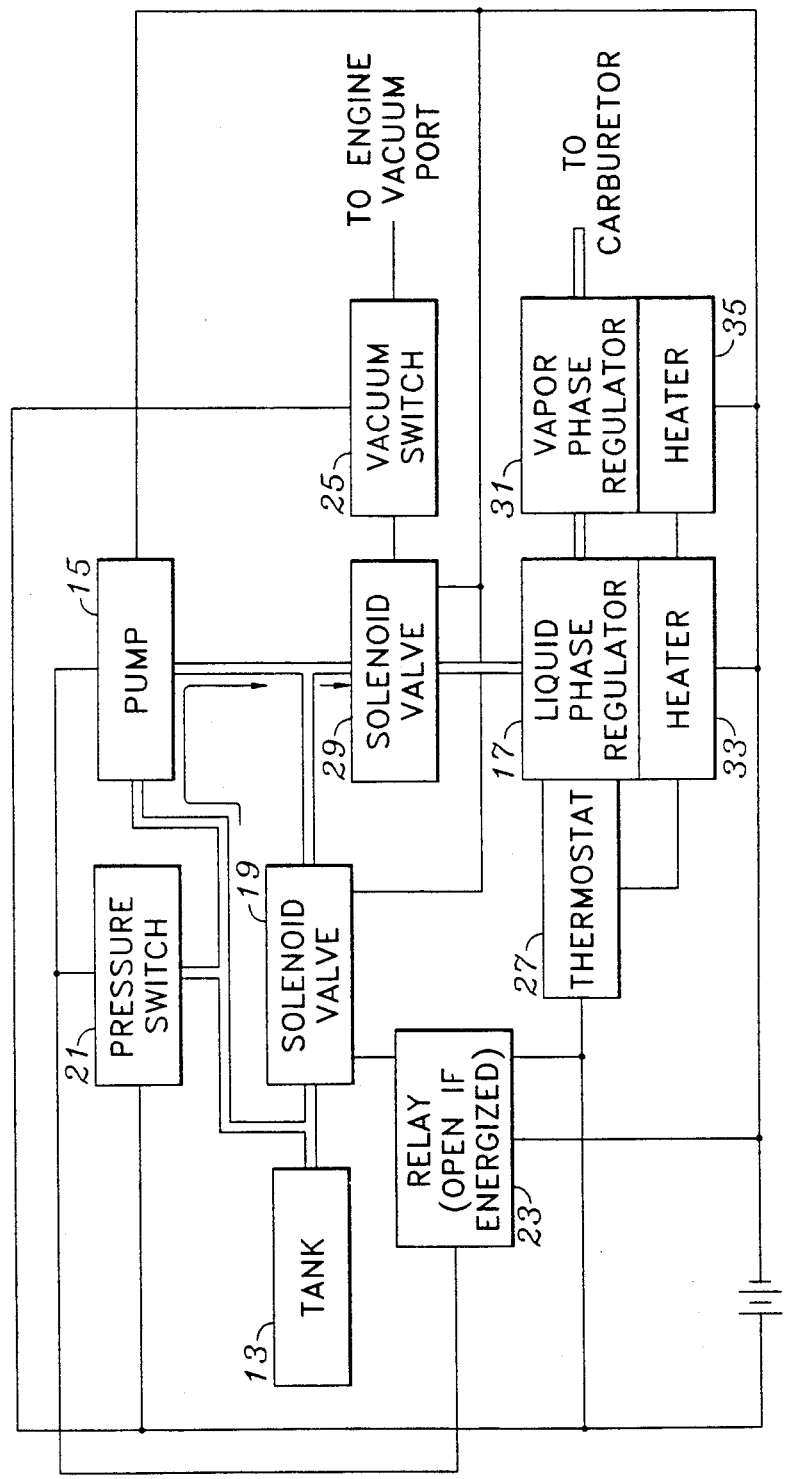
FIG. 1 is a schematic representation of a propane fuel delivery system formed in accordance with the present invention.

The detailed description set forth below in connection with the appended drawings is intended as a description of the presently preferred embodiment of the invention, and is not intended to represent the only form in which the present invention may be constructed or utilized. The description sets forth the functions and sequence of steps of constructing and operating the invention in connection with the illustrated embodiments. It is understood, however, that the same or equivalent functions and sequences may be accomplished by different embodiments that are also intended to be encompassed within the spirit and scope of the invention.

FIG. 1 is a block diagram illustrating the operation of a propane fuel delivery system 11 formed in accordance with the present invention. The system includes a tank 13, which is typically a liquid phase propane canister. The tank 13 is connected to liquid phase regulator 17 via a first fluid path through solenoid valves 19 and 29. The tank 13 is alternately connected to regulator 17 through a second fluid path through pump 15 and solenoid valve 29. The pump 15 is activated by pressure switch 21.

Assuming the ambient temperature is sufficiently high the vapor pressure within tank 13 is sufficient to propel propane through solenoid valves 19 and 29 and to the liquid phase regulator 17, and thereafter to the vapor phase regulator 31, which in turn regulates the gas pressure delivered to an external carburetor (not shown). The solenoid valve 29 is regulated by a vacuum switch 25 which is connected to the vacuum port of an internal combustion engine (not shown). As long as the engine remains in operation the vacuum switch 25 enables the solenoid 29 to communicate propane from the regulator 17 to the carburetor. When the engine stops the vacuum switch 25 operates to disable the solenoid 29, preventing any further flow of propane to the regulator 17.

Conventionally, when the ambient temperature falls below a certain level propane from tank 13 will either not reliably be communicated to regulator 17, or will be communicated at a pressure level too low to provide proper output to vapor-phase regulator 31. The present invention provides a means for responding to such a situation and for facilitating the operation of the fuel delivery system under such cold weather conditions. Pressure switch 21 operates to sense the pressure within tank 13 and to detect pressure conditions which would preclude the reliable delivery of propane to the regulator 3 via the solenoid valves 19 and 29. When such conditions are sensed the pressure switch 21 enables the operation of pump 15 so as to draw propane from the tank 13 through the pump 15, which in turn communicates the propane to the regulator 17 under sufficient pressure to insure proper output to vapor-phase regulator 31. The operation of pressure switch 21 and relay 23 closes solenoid valve 19 to prevent any back flow through the solenoid valve 19 while the pump 15 is operating. The pressure switch 21 is therefore operative to generate an enable signal which is communicated to pump 15 when the pressure within tank 13 falls below a variable, predetermined threshold. The same enable signal is also communicated to relay 23 which operates to disable the fluid flow through solenoid valve 19. Pump 15 is therefore operative to pressurize the fluid flow to regulator 17 at the right pressure to insure proper propane flow to the carburetor, even when tank pressure is zero. Where the ambient temperature reduces tank pressure below the minimum operating point, it may be advisable to preheat the regulators 17 and 31, by heaters 33, 35 for a predetermined time before the pump 15 is engaged and to continue to heat the regulators as long as the liquid propane temperature is below a predetermined threshold. Thermostat 27 operates to sense the temperature of the regulator 17 and enables heaters 33 and 35 when the temperature of the regulator 17 falls below a predetermined threshold. In accordance with those procedures propane is provided to the connected internal combustion engine at the proper density and the engine will run properly.

The operation of pump 15 is therefore effective to supplement the vapor pressure within the tank 15 in order to provide sufficient pressure on the fluid entering the liquid phase regulator 17 to cause the output of regulator 17 to be in a vapor state. Absent the existence of pump 15 the fluid vapor pressure within tank 13 may be too small to provide a pressure differential across liquid phase regulator 17 and, therefore, the propane may not be transferred to a vapor phase.

The pressure switch 21 is set at a threshold level of tank pressure corresponding to the requirements of the liquid phase regulator 17. The pump 15 is activated when the required pressure level at the input to liquid phase regulator 17 falls below the pressure level necessary to insure proper operation of the regulator 17. As will be apparent to one of ordinary skill in the art the particular threshold at which pressure switch 21 is set may be varied in accordance with the particular implementation and the operating characteristics of the equipment being used.

The present invention is effective to maintain the delivery of vapor phase propane to an external carburetor, independent of propane tank temperatures. The system automatically supplements the vapor pressure within tank 13 when the pressure is insufficient to facilitate vapor phase transition in the regulator 17. Thus, the present invention directly supplements the pressure conditions within the fuel delivery system, rather than affecting a pressure change as a consequence of heating the tank or other portions of the system in a manner that may be more cumbersome, less reliable, and more prone to accident and injury.

In the presently preferred embodiment pump 15 is implemented as a stainless steel cryogenic pump having a magnetic drive, such as Model No. B9006M-B6729 manufactured by Tuthill Pump Company, and pressure switch 21 is implemented as a Series V switch produced by Hobbs Corporation. Additionally, the liquid phase regulator 17 may be implemented as a Model 11A18 regulator produced by J & S Carburetor Company. The vapor phase regulator 31 may be implemented as a Model 50 regulator produced by Beam Equipment. The heaters 33, 35 may be implemented as power resistors attached to the regulators 17, 31 respectively. In the presently preferred embodiment a series of 7½ ohm resistors are secured to the regulators in parallel, with a total dissipation of approximately 90 watts for each heater. The resistors may be similar to the model MP820 resistors marketed by Caddock Resistor Corporation. The thermostat 27 may be implemented as a Model 3100 thermostat switch produced by Elmwood Sensors. Vacuum switch 25 may be implemented as a Model 1501L switch produced by Beam Equipment. Solenoid valves 19, 29 may be implemented as Model FL218 valves, also produced by Beam Equipment. The solenoid valves are preferably selected to remain operative at temperatures of less than −30° C.

As will be apparent to one of ordinary skill in the art the precise components which form the present invention may be varied in accordance with a particular application in which the invention finds usage. Moreover, it is anticipated that the invention may have application beyond propane fuel delivery systems and, in its broader aspects, extends to various types of gaseous fuel delivery systems. These and other modifications, enhancements and additions will be apparent to one of ordinary skill in the art and are not intended to serve as limitations on the broader aspects of the present invention.

What is claimed is:

1. A gas-phase fuel delivery system for delivering a vapor phase fuel independent of exterior temperatures, the system comprising:

a storage tank for storing a volume of fuel; a regulator in fluid communication with said tank for receiving fuel from said tank and for outputting the fuel in a vapor phase;

a pressure sensor in fluid communication with said tank for monitoring pressure within said tank, said pressure sensor being operative to generate a pump enable signal when the pressure within said tank is less than a predetermined threshold;

a pump in fluid communication with said tank and said regulator for supplementing fluid pressure of the fuel from said tank to said regulator in response to the pump enable signal from the pressure sensor, the pump being operative to supplement fuel fluid pressure to a level sufficient to cause the output of said regulator to remain in a vapor phase.

2. A fuel delivery system as recited in claim 1 further including a first solenoid valve for enabling a fluid flow path to said regulator only when the fuel pressure within said tank is above said threshold.

3. A fuel delivery system as recited in claim 1 wherein said pump is a cryogenic pump operative at temperatures of less than $-30°$ C.

4. A fuel delivery system as recited in claim 1 wherein said storage tank is formed to store a volume of propane, substantially in liquid phase.

5. A gas-phase fuel delivery system for effecting and maintaining delivery of a vapor phase fuel independent of fuel tank temperature, the system comprising:

a gas tank for storing a volume of fuel; a regulator, in fluid communication with said tank, for regulating the pressure fuel of discharged by said regulator;

a solenoid valve disposed along a first fluid conduit path intermediate said tank and said regulator;

a cryogenic pump disposed along a second fluid path intermediate said tank and said regulator;

a pressure switch connected to said tank and said pump, said pressure switch being operative to determine the pressure within said tank and to activate the pump when the pressure within said tank falls below a predetermined level, and to activate the first solenoid valve to preclude fluid flow through said first fluid path;

a thermostat connected to said regulator for sensing the temperature of said regulator; and a heater connected to said regulator for heating the regulator when the thermostat senses that the regulator temperature has fallen below a predetermined level.

6. The system as recited in claim 5 including a solenoid in fluid communication with the regulator for interrupting fluid flow to the regulator.

7. The system as recited in claim 6 further including a vacuum switch connected to said solenoid for controlling the operation of the solenoid.

* * * * *

UNITED STATES PATENT AND TRADEMARK OFFICE
CERTIFICATE OF CORRECTION

PATENT NO. : 5,010,868

DATED : April 30, 1991

INVENTOR(S) : Jerry Clements

It is certified that error appears in the above-identified patent and that said Letters Patent is hereby corrected as shown below:

On the title page, please delete in the inventor's address, "Pases" and insert therefore --Paseo--.

In Column 3, Line 31, delete "3" and insert therefore --31--.

In Column 4, Line 67, after "fuel;" begin new paragraph.

In Column 6, Line 1, after "fuel;" begin new paragraph.

Signed and Sealed this

First Day of September, 1992

Attest:

DOUGLAS B. COMER

*Attesting Officer*   *Acting Commissioner of Patents and Trademarks*